Patented Dec. 28, 1948

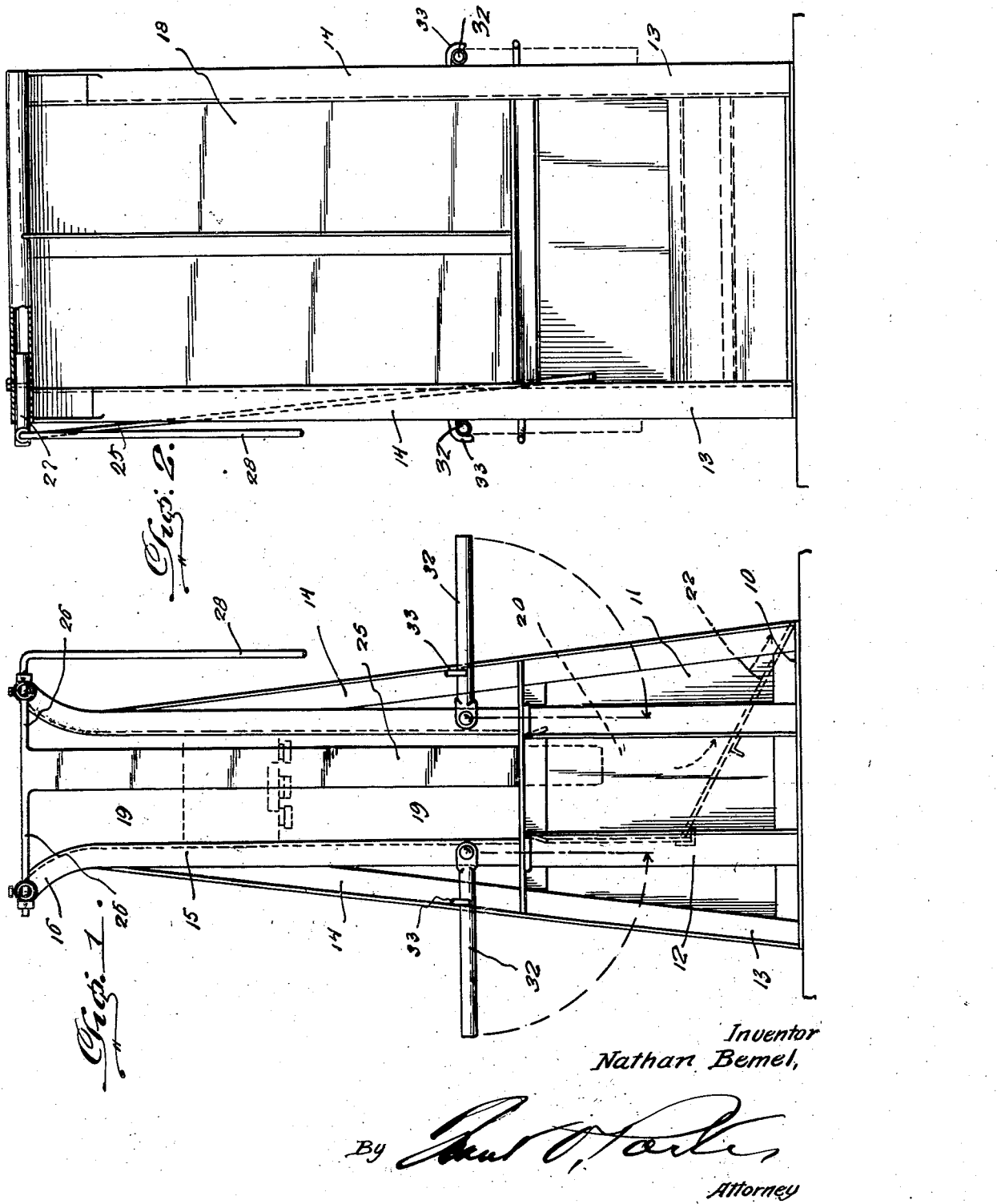
Dec. 28, 1948.  N. BEMEL  2,457,519
PORTABLE BATTERY STRIPPING DEVICE
Filed July 13, 1945  2 Sheets-Sheet 1
Inventor
Nathan Bemel,
By
Attorney

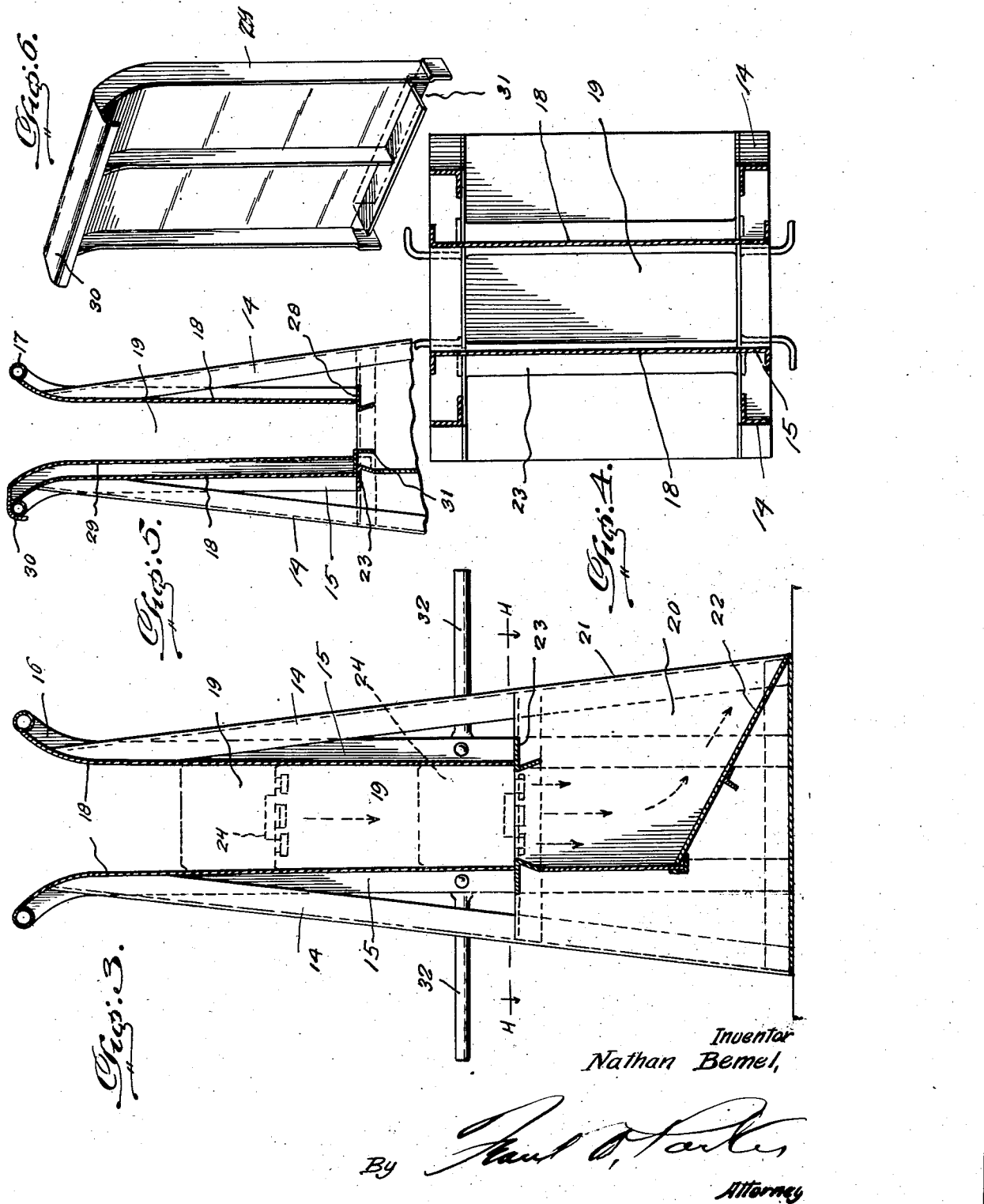

2,457,519

UNITED STATES PATENT OFFICE 2,457,519

PORTABLE BATTERY STRIPPING DEVICE

Nathan Bemel, Rochester, Minn.

Application July 13, 1945, Serial No. 604,835

1 Claim. (Cl. 29—204)

The invention relates to a portable parts extractor, and more especially to a wet storage battery cell extracting apparatus.

The primary object of the invention is the provision of an apparatus of this character, wherein wet storage batteries in single order can be placed therein for the removal or extracting of the interior thereof, for the acquiring of the metal content, with ease and dispatch, and eliminates damage to the clothing by the splashing of the electrolite therefrom onto the said clothing worn by the user of such apparatus, and in this manner salvaging of the lead parts is made easy and with dispatch.

Another object of the invention is the provision of an apparatus of this character, wherein different sizes of batteries can be serviced thereby for the salvaging of the valuable parts thereof, usually consisting of grids or plates of an alloy of lead and antimony or other suitable metals, these parts being recovered by extraction thereof from the container therefor, which is generally made from a low grade insulating material, the apparatus being portable, so that it can be moved from one locality to another by man-power, as for example a place of deposit to a place of transportation.

A further object of the invention is the provision of an apparatus of this character, which is extremely simple in construction, thoroughly reliable and efficient in operation, strong, durable, readily and easily handled, requiring no hand breaking of the casings of batteries, for the extraction of the content thereof, no damaging of wearing apparel, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings:

Figure 1 is a side elevation of the apparatus constructed in accordance with the invention.

Figure 2 is a front elevation.

Figure 3 is a vertical longitudinal sectional view through the apparatus.

Figure 4 is a sectional view taken approximately on the line 4—4 of Figure 3 looking in the direction of the arrows.

Figure 5 is a fragmentary detail view similar to Figure 3 showing a guage plate fitted therein.

Figure 6 is a perspective view of the guage plate removed.

Similar reference characters indicate corresponding parts throughout the several views in the drawings.

Referring to the drawings in detail, the apparatus constituting the present invention, comprises a perpendicularly disposed portable chute body, involving a flat horizontal base formed from a rigid plate 10 of sheet metal, united with and between side panels 11, these being reinforced by spaced inner and outer angle bars 12 and 13, respectively, which extend upwardly at the outer faces of such panels welded or otherwise united therewith. The outer bars 13 are extended upwardly a determined distance above the panels 11 to effect a throat support 14, they being of uniform height with respect to each other, and slopingly converge toward one another.

The inner bars 12 extend upwardly beyond the panels 11 in spaced parallel relation to each other, and these extensions 15 are in a perpendicular path, merging with the bars 13 at their upper ends, where said bars 12 curl outwardly in reverse directions as at 16, with tubular cross members 17 unitary therewith. The bars 12 above the panels 11 with the facing plates or sections 18 supported thereby create a guide threat 19 communicative at the lowermost end with a box-like delivery chute or hopper 20, which at one side has formed therewith a dispensing doorway or opening 21, the bottom 22 of such chute or hopper 20 being inclined in the direction of the said doorway or opening 21, as best seen in Figures 1 and 3 of the drawings.

As the point of communication of the throat 19 and the chute or hopper 20 is formed horizontally arranged rest or stop shoulders 23, which are in the same plane with each other, and when a battery casing is placed in the throat 19, through gravitation thereof due to the own weight of such casing, the latter is abruptly brought to a standstill on the shoulders 23, and the suddenness of striking action therebetween, the content of this casing drops out of the same for recovery within the said chute or hopper 20, whence such content will be discharged through the doorway or opening 21 for the salvaging of the said content, the said battery casing being generally identified at 24 by dotted lines in Figure 3 of the drawings. The course of the casing 24 is indicated by arrows in said Figure 3 of the drawings.

The battery casing 24 after relieved of its content is removed from the body, at one open side of the throat 19, which latter is open at directly opposite sides thereof between the facing plates or sections 18 throughout the extent of such throat, and such removal of the casing 24 is had by a manually operated kicking blade 25 depending from a turning arbor 26, rotatably fitted in bearing hangers or bracket 27, the arbor being crosswise of one open side of the throat 19 at the top thereof, and is formed with a crank handle 28, adapted to be manually actuated for the kicking operation of the blade 25 for the throwing of the empty casing 24 out of the body or the throat 19 thereof.

Detachably insertable within the throat 19 is a sizing or gauge follower 29, which at its upper end is provided with a hanging ledge 30, while at the lower end is formed a counterseat 31, the latter being adapted for interfitting with one shoulder 23, and the ledge 30 for hooking engagement with one of the cross members 17 at the upper end of the thoat 19, and the purpose of this follower 29 is to regulate the latter for accommodating smaller size battery cases 24 than when the said throat is clear of such follower 29, and in this way the apparatus is enabled to take care of different sized batteries, to extract the cells and vital interior parts of the same, in the working of such apparatus.

Swingably connected to the inner bars 12 at the proper height of the apparatus are folding handle bars 32, which are foldable inwardly in non-usable position, and unfolded outwardly to engage in keepers 33, for use, so that the said apparatus can be carried from one locality to another, or is manually portable for convenience in the servicing thereof.

In the operation of the apparatus, the storage battery is thrown or inserted in the top of the throat 19 and by its own weight will drop down onto the shoulders 23, and through impact the content of such battery 24 is extracted therefrom, and this content is dispersed, and also the empty casing of the same. There is no possibility of the clothing of an operator of the apparatus becoming damaged through splashing of the liquid content of such battery during content extraction. The valued content of each battery is readily recovered with ease and dispatch.

What is claimed is:

A portable battery stripping device, comprising a unitary portable structure having a substantially vertical chute body creating a lower box-like hopper, involving a base, upstanding side panels and spaced inner and outer angle bars, respectively, the latter carrying and reinforcing the side panels at the outer faces thereof, upward extensions to the inner bars and having outwardly flared upper ends above the panels, surfacing plates supported by the inner bars and effecting a guide throat communicating with the hopper, said hopper having a dispensing doorway and an inclined bottom directed toward the latter for gravity dispensing of battery elements through the doorway, striking shoulders at the point of communication of the hopper and the throat for arresting a battery casing when dropped within the said throat, the throat being open at opposite sides thereof above the hopper, a horizontal shaft journaled in the upper side plates of the throat, a kicking blade depending from said shaft extending into the hopper entirely through the throat in confronting relation to the open sides of said throat, a lever integral with said shaft for turning said shaft and kicker plate, and portable hand grips attached to the chute body.

NATHAN BEMEL.

REFERENCES CITED

The following references are of record in the file of this patent:

UNITED STATES PATENTS

| Number | Name | Date |
| --- | --- | --- |
| 2,119,857 | Eppensteiner | June 7, 1938 |
| 2,119,859 | Eppensteiner | June 7, 1938 |